Feb. 15, 1949.  W. NOBLE  2,461,655
SEAL
Filed Feb. 19, 1945  4 Sheets-Sheet 1
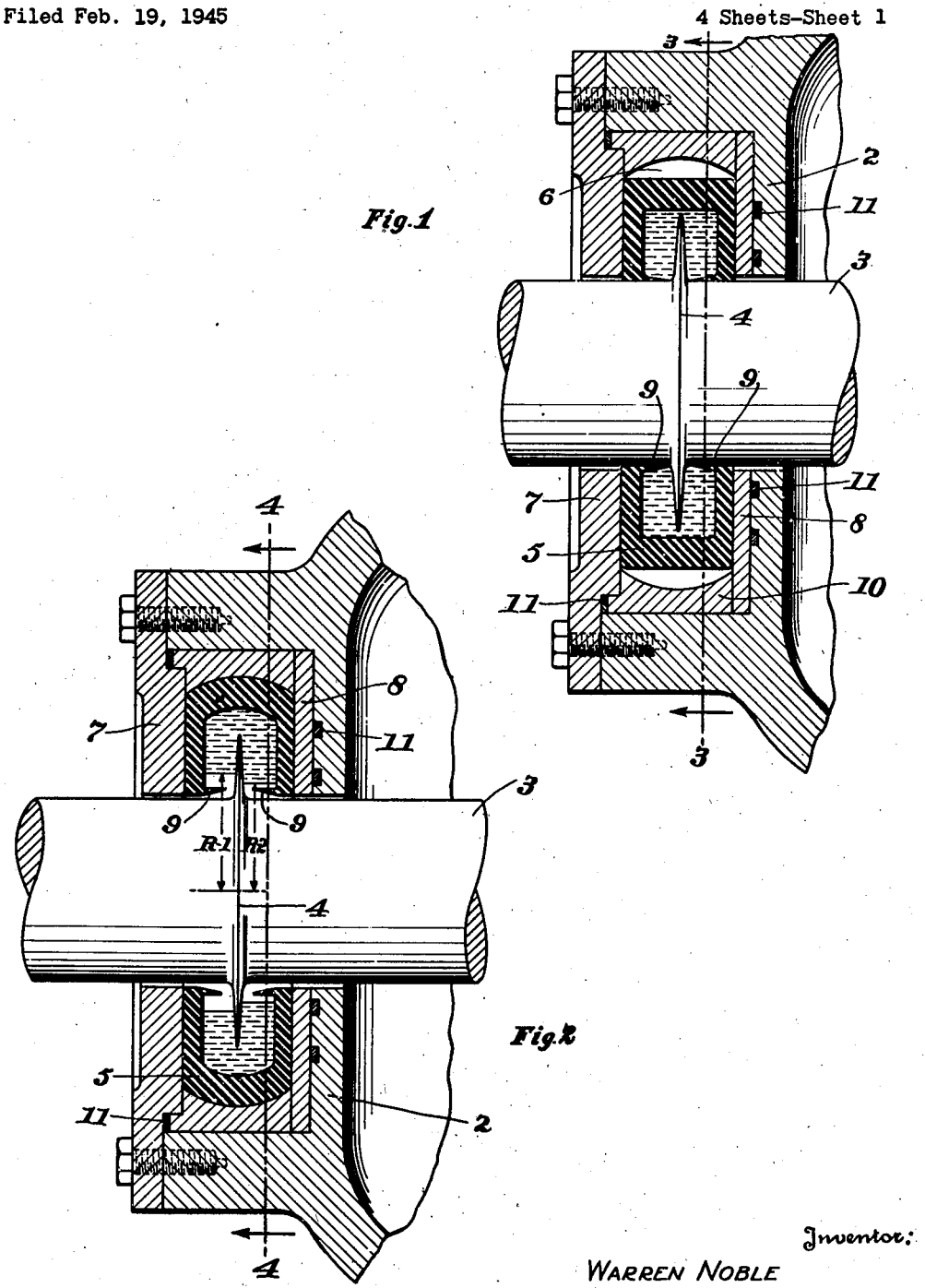
Inventor:
WARREN NOBLE Feb. 15, 1949. W. NOBLE 2,461,655
SEAL
Filed Feb. 19, 1945 4 Sheets-Sheet 2

Inventor:
WARREN NOBLE

By Cushman, Derby, Cushman.
Attorneys

Feb. 15, 1949.  W. NOBLE  2,461,655
SEAL
Filed Feb. 19, 1945  4 Sheets-Sheet 3

Inventor:
WARREN NOBLE

Attorneys.

Feb. 15, 1949. W. NOBLE 2,461,655
SEAL
Filed Feb. 19, 1945 4 Sheets-Sheet 4

Inventor:
WARREN NOBLE

Patented Feb. 15, 1949

2,461,655

UNITED STATES PATENT OFFICE 2,461,655

SEAL

Warren Noble, Garden City, N. Y., assignor, by mesne assignments, to Donald R. Hanson, Melrose, Mass., and C. Willard Hayes, Bethesda, Md., as trustees Application February 19, 1945, Serial No. 578,604

16 Claims. (Cl. 286—9)

This invention relates to the sealing of interacting rotating elements of a fluid pressure machine against leakage of any nature in any direction and independent of the static or running conditions existent between the elements.

It deals with a method whereby a shaft entering a chamber in which either pressure or vacuum exists may be given working facility without danger of leakage from the chamber whether the elements are rotating or stopped.

In the accompanying drawings, a number of modifications of the invention are shown, somewhat diagrammatically for purposes of illustration.

In the drawings:

Figure 1 is a longitudinal, axial section and partial elevation of one form of seal, with the parts in the positions they assume when at rest.

Figure 2 is a similar view, showing the condition of the parts when rotating at speed.

Figure 3:
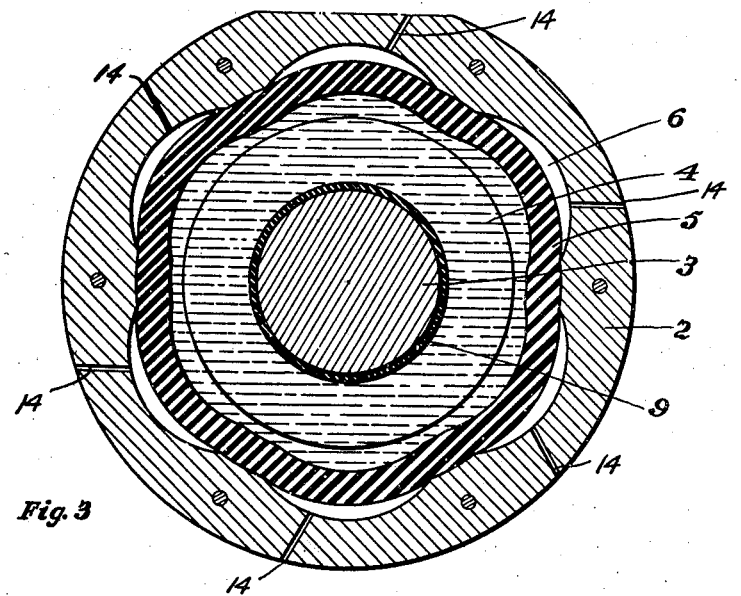
Figure 3 is a fragmentary trans-axial section and partial elevation of Figure 1.

In Figures 1–6, 2 represents the rotatable element, 3 the stationary member and 4 the disc or flange. Only a fragmentary portion of the rotatable member is shown. It will be understood that this may be a portion of the casing of an apparatus of the type discussed above and may be supported by appropriate bearing means, not shown, for rotation upon and about the axis of the stationary shaft 3, which may, in turn, be carried by suitable supports, not shown.

Referring to Figure 1, the envelope 5 made of an elastic material such as rubber or a synthetic substitute is an annular moulded seamless component accurately sized to fit within distortion free limits within the circular bore 6 of the scalloped surface of the enclosing structure 2. Its walls are vulcanized to the assembly cover 7 and the plate 8. It comprises, originating from the side-walls, the accurately moulded lips 9—9 which, in pre-assembly condition, are just free of the shaft 3 diameter. These lips are of tapered section leading to a feather edge at their inner ends. The taper is chosen so that, when rotated at designed speed, there will be no re-entrant formation to initiate an air or vapor trap. The purpose of vulcanizing the side walls to rigid plates is to avoid distortion of the lips from peripheral influences, i. e., when the outer wall of the envelope is stretched into the scalloped recesses of the chamber 2. A spacing ring 10 keeps the rigid members 7 and 8 the proper distance apart to obviate distortion from axial disturbance. Suitable packing rings to preclude leakages around the plate 8 and ring 10 are indicated at 11. The plates 7 and 8 and the chamber wall give some positive though slight diametrical clearance about the shaft 3, contact with the shaft occurring only at the lips 9, 9 when pressed inward by the entrained liquid. Without this liquid, the lips would just not touch the shaft.

The disc 4 which for complete and permanent sealing must be either integral with or properly brazed to the shaft 3 is of a radial depth chosen with regard to the pressure differences within and without the chamber 2 the liquid selected and the ultimate operating speed in R. P. M. The necessity for integrality is found in the certainty of very minute leakage along the parting surface if made separately and not brazed but only pressed in place. This leakage, slight though it may be, is sufficient to abrogate the sealing function in time, but the importance of the precaution cannot be ignored. Despite cost the disc machined from the same forging is to be highly recommended.

When the seal is filled, which may be done by loading passages drilled in the shaft or by special loading devices, none of which are illustrated since their location and construction are matters of related design features, sufficient liquid is forced in to expand the envelope slightly which assures pressure on the liquid retention lips 9, 9.

In Figure 3, the envelope 5 is depicted with the scalloping action started. The intensity of pressure is a function of the thickness of the outer wall of the envelope, the character of the material and the span of the scalloping. There is no need of any high pressure which would only increase the lip to shaft friction during the first few revolutions.

In the interests of lowering local stresses in the envelope wall, it is practical to use scallop recesses curved in both planes as indicated in Figures 1–4.

In Figure 2, the seal is shown at speed. The change in volume due to the expansion of the envelope 5 into the scallops has changed the volume sufficiently to enable the liquid to clear the lips 9, 9 which have lifted by centrifugal action to their limit for the designed speed.

The liquid stands with different radii about the disc due to the differences of pressure within and without chamber 2 and the ambient atmosphere. The absolute pressures are related to the instantaneous density of the liquid under the conditions of angular motion. Thus the column indications, shown as radii $R^1$, $R^2$ in Figure 2 may be but slightly different though referring to pressure differences of sufficient magnitude to support liquid columns many hundred times the effective differences found in operation.

Figure 4:
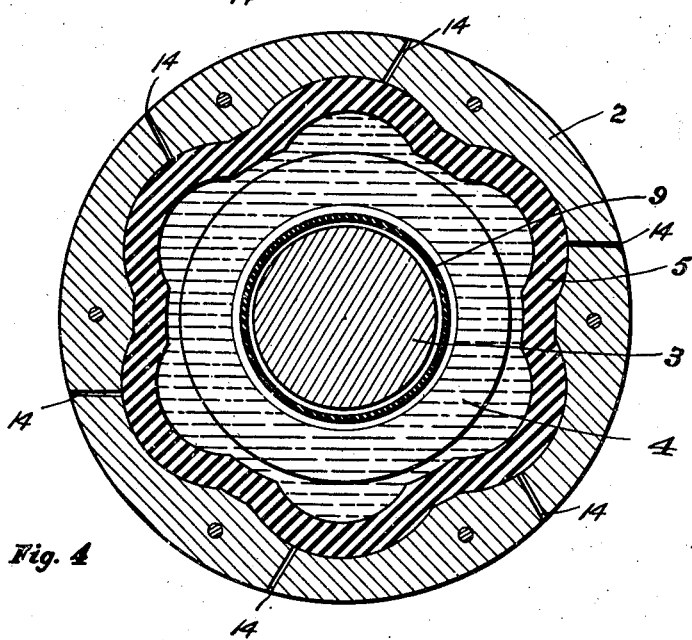
Figure 4 is a similar view, corresponding to Figure 2.

In order to facilitate expansion of the envelope into the scallops in the ring 10 or the casing 2, air vents 14 may be provided, as indicated in Figures 3 and 4.

Figure 5:
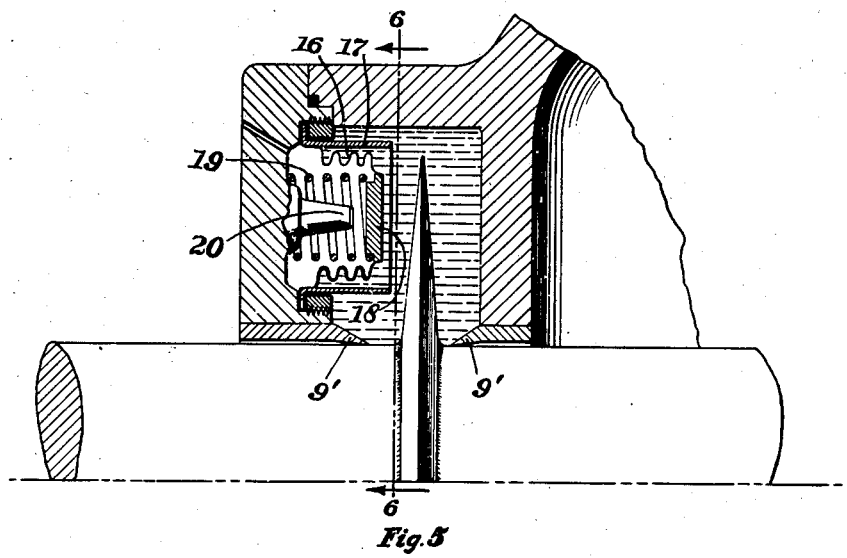
Figure 5 is a longitudinal half section and partial elevation of a modification.
Figure 6:
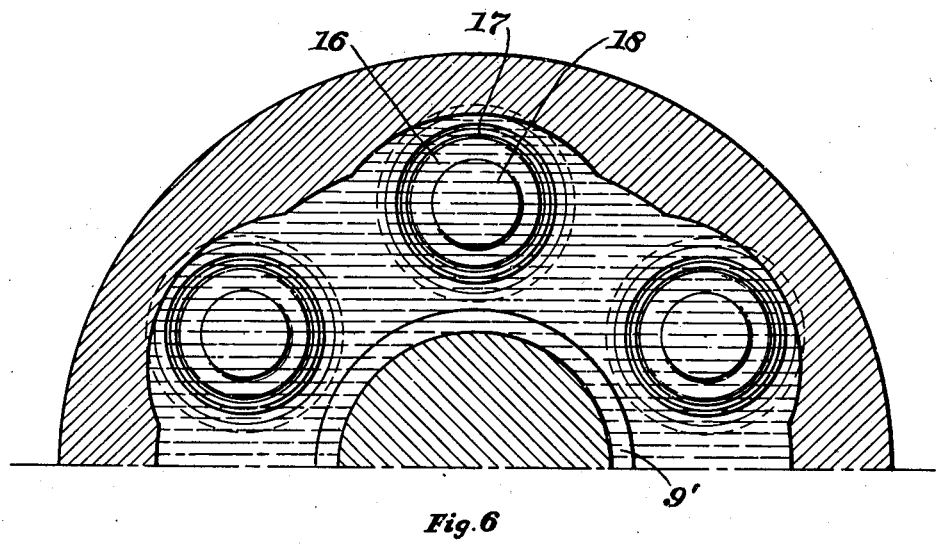
Figure 6 is a transverse section taken substantially on line 6—6 of Figure 5.

Figure 5 illustrates one way of employing metallic parts to implement the volume change and dispenses with the envelope. Each of a series a bellows 16 is mounted within a tubular casing 17 to restrain it from misalignment axially when the machine is in operation. Its head reinforcement 18 makes seat for the spring 19 and acts as one element of a limiting stop completed by the horn 20. The characteristics of this spring determine the lip pressure on cessation of motion. The lips shown 9', 9' are moulded rubber (or substitute compound) and are vulcanized to their metallic mountings. It is often advantageous to mould some small proportion of graphite into such lip rings for while their contact under machine acceleration is brief, inherent lubricating properties are to be commended. This metallic chamber expansion gear is free of the dangers encountered with the envelope type, of leakage around the outer surface of the envelope, since the liquid seal is contiguous to all walls of the chamber. The action of this seal is precisely as when using an elastic envelope in that relief of pressure permits the lips to free themselves at speed. If metallic lips are used, their formation needs to be dictated by speed conditions and the practices used to secure both the necessary flexibility and precision. Their preloaded condition must in any case provide for vapor or air passage. The only objection to metallic lips is found in mechanized errors of fabrication and installation plus a lack of sensitivity to non-concentricity.

Figure 7:
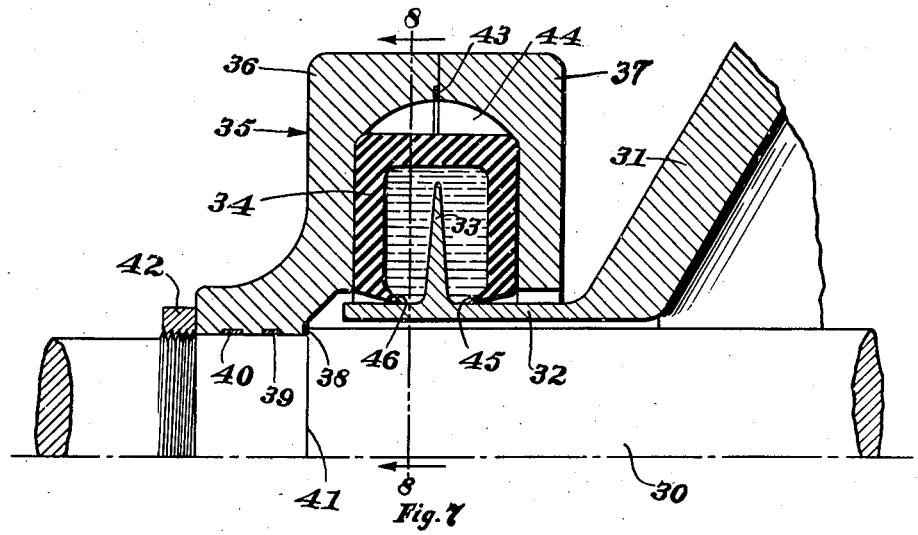
Figure 7 is a view, similar to Figure 5, showing another modification, in accordance with which the shaft rotates and the casing is stationary.
Figure 8:
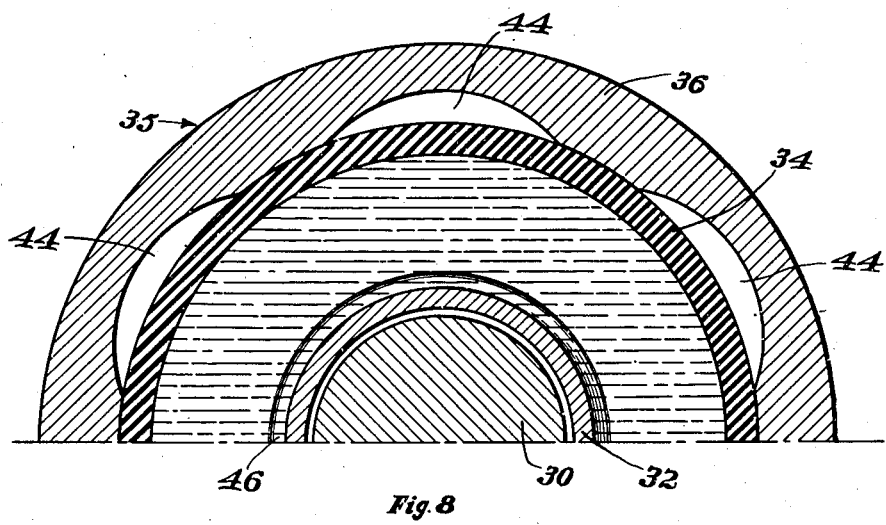
Figure 8 is a transverse section of Figure 7, taken substantially on line 8—8 thereof.

Figures 7 and 8 illustrate an arrangement of parts providing a similar seal between a rotatable shaft 30 and a stationary casing 31. The shaft, of course, may be supported in any suitable bearing structure, not shown. The casing 31 is provided with a circular, cylindrical extension 32, concentric with the shaft 30. A radially projecting, integral disc or flange 33, carried by the extension 32 is disposed within an annular, elastic envelope 34, carried by and embraced within an annular housing 35 fast on the shaft 30. The housing preferably comprises two sections 36 and 37, the interior side faces of which are vulcanized to the elastic envelope 34, as mentioned above. Appropriate packing rings 38, 39 and 40 may be employed to prevent the leakage of air or gas between the housing section 36 and the shaft. This section 36 may be held upon the shaft in abutting relation to a shoulder 41, by a nut or threaded ring 42. The joint between the two housing sections 36 and 37 may be packed as indicated at 43 and appropriate vents, not shown, may be provided from the scalloped spaces 44 to the outside atmosphere.

The envelope, of course, is filled with a sealing liquid, as previously described and the lips 45 and 46 make contact with the cylindrical extension 32, when the parts are at rest, as shown in Figure 7.

When the shaft commences to rotate, the centrifugal force acting on the liquid in the envelope 34 expands the envelope into the scalloped spaces and permits the lips 45 and 46 to lift out of contact with the stationary cylindrical extension 32, so that the seal is effected exclusively by the liquid on opposite sides of the disc or flange 33 and is substantially frictionless.

In any and all cases, the stationary shaft or sleeve elements need to be highly finished by precision methods and the discs should be true as well as highly polished.

The friction of the seal in action is extremely low, usually being measurable conveniently in ounce feet as a unit using speeds up to 10,000 feet per minute. Heating of the liquid, especially if mercury is used, need occasion no concern provided the surface finishes are good; conditions easily obtainable by the now normal "superfinishing" methods. Rough surfaces and lack of truth tend to cavitation occurring at speed and so to abrogate the purpose of the seal. In actual design, the securing of these qualities of trueness, smoothness, and freedom of air or vapor trapping as the liquid toroid contracts its diameter with diminishing speeds are paramount considerations.

Air or vapor trapping must be avoided at all costs and while there are innumerable possible constructions, the one adopted for a particular application should be examined most critically for this possible flaw. The transfer of a tiny bubble may seem a small thing in a large machine but over a period of many stops and starts, it can cut efficiency most unduly, especially if the application be one in which vapor condensation is involved within the machine. Provided, however, the necessary care be taken to avoid trapping and normal high grade manufacturing is available, the seal will be found to be absolute within the range of machine life. With several of the rubber substitutes available today, there is no need to avoid, or to make special provision for the deflection of lubricating oil from the atmospheric side of the seal saving only the condition it shall not be vaporizable within the temperature range under which the seal works.

This description has dealt with only the fundamentals of the sealing art as expressed by this invention and has used the simple case of a chamber and a shaft as a basis. Without departure from principle, however, many useful purposes can be envisaged. One such is the application of the principle to sealing between elements of widely varying speeds and pressures. For example, the rotative generator presents difficulty when a suitable steam tight joint between the generator which generates and the superheater best stationary is sought, especially where elevated pressures are concerned. Such a seal as above described will take care of the conditions perfectly since the seal chambers can be rotated separately from the included elements, one of which in this case would be rotating at some desirable speed, the second being at rest. If these be surrounded by a seal chamber rotated at a proper speed by a separate motor, a substantially frictionless but absolutely tight joint can be achieved independent of expansive and temperature effects of other natures.

The details of seal design depend so much on sizes, speed and associated conditions as to make any attempt to outline anything but the principles involved substantially useless. In practice, there are expedients to reduce the volume of liquid involved (especially if mercury is the liquid employed) the use of partitions on either side of the disc to make sure any bubble trapped due to faulty action of the liquid sealing lips (sometimes due to errors in concentricity, vibration or irregular moulding) will remain on its own side of the disc to be expelled on restarting without danger of transfer to the alternate side. Where the metallic outer chamber, without rubber lining, is employed, tapering of the periphery either way to the greatest diameters remote from the disc will achieve the result of bubble segregation.

The use of mercury is desirable since it has a positive, i. e., convex meniscus, so that at the time of the collapse of the liquid toroid, the mercury can touch the shaft surface an infinitesimally short time before the lip closes. In this regard, it is well to assure the radius between the shaft and disc is greater than that of the mercury junction at critical speed. It is of the utmost importance to make sure there are no re-entrant angles, i. e., acute angles with the axis of rotation, in any of the elements from or about which air or vapor expulsion is required. Smoothness and truth of all parts is essential, roughness inevitably tends to hold gaseous particles eventually to generate bubbles. It must be remembered the expulsion of all air or vapor upon collapse of the liquid toroid is a prime essential of a successful seal.

Filling passages or devices need also to have smooth surfaces—ordinary drilling is not sufficient—if the passageway is in solid stock reaming for at least two steps is indicated and air traps in the passage design need to be watched for. Balance considerations are also very important since the vibrations set up by a descending speed scale which may happen to synchronize can seriously disturb the final instant of liquid sealing and lead to gas trapping.

Where temperature conditions are extreme, the full metallic chamber is desirable, avoiding a heat transfer across rubber, never entirely without possibility of trouble.

Fortunately, the range of volume change need never be high but care needs to be taken to be sure of the permanency of elasticity since the low pressure range which cares for the liquid sealing may fade enough to make the positive pressure side uncertain.

Remember always the use of the seal is prompted to the end of absolute sealing, probably an impossible condition though approachable within limits comparable with the life of the rest of the machine employing it but only to be achieved by the most meticulous attention to all subsidiary conditions. The conclusion sought is a molecularly tight condition—which can at the best only be approximated—the perfection of the approximation is a measure of the detail competence.

Having now described one form of my invention, what I claim is:

1. A seal for concentric stationary and rotatable members, the latter of which is adapted at times to be held substantially stationary, comprising means carried by the rotatable member defining an annular chamber, open at its inner side facing and surrounding the stationary member and having a wall portion displaceable under pressure changes to vary the volumetric capacity of the chamber, said open, inner side being marginally defined by displaceable sealing means urged into sealing contact with the stationary member when the rotatable member is stationary, an annular flange on the stationary member projecting into the chamber through said open side between said sealing means, and a body of liquid permanently substantially filling said chamber, held therein during rotation of the rotatable member by centrifugal force and constituting a substantially frictionless liquid seal between the chamber and the flange with said sealing means out of contact with the stationary member, and held in the chamber by said sealing means when the rotatable member is substantially stationary.

2. A seal for concentric stationary and rotatable members, the latter of which is adapted at times to be maintained stationary, comprising an annular flange projecting from the stationary member, means carried by the rotatable member defining an annular, expansible chamber surrounding and enclosing the flange, an annular body of liquid in the chamber providing a substantially frictionless seal with the flange when the rotatable member is rotated, and a pair of flexible lips adjacent the inner margin of the chamber, adapted when the rotatable member is stationary to make physical contact with the other member to provide a supplemental seal and to prevent the escape of liquid from the chamber.

3. A seal for concentric stationary and rotatable members, the latter of which is adapted at times to be maintained stationary, comprising an annular flange projecting from the stationary member, means carried by the rotatable member defining an annular, expansible chamber surrounding and enclosing the flange, an annular body of liquid in the chamber providing a substantially frictionless seal with the flange when the rotatable member is rotated, and a pair of continuous, annular, resilient, flexible, rubber lips adjacent the inner margin of the chamber, adapted when the rotatable member is stationary to make physical contact with the other member to provide a supplemental seal and to prevent the escape of liquid from the chamber.

4. A seal for concentric stationary and rotatable members, the latter of which is adapted at times to be maintained stationary, comprising an annular flange projecting radially from the stationary member, a resilient, toroidal envelope embracing the flange, carried by the rotatable member, confined against axial expansion but adapted for limited radial expansion, a body of liquid in said envelope disposed on both sides of the flange and constituting a substantially frictionless seal when the rotatable member and the envelope are rotated, and a pair of flexible resilient lips associated with said envelope and adapted to make physical contact with the stationary member to prevent the escape of liquid from the envelope when the latter and the rotatable member are stationary and to provide a supplemental seal between the members.

5. A seal for concentric stationary and rotatable members, the latter of which is adapted at times to be maintained stationary, comprising an annular flange projecting radially from the stationary member, means carried by the rotatable member defining an annular chamber embracing the flange, a body of liquid substantially filling the chamber when the rotatable member is stationary, a pair of flexible resilient lips carried by the rotatable member adjacent the inner margin of the chamber and spring pressed bellows means associated with the chamber, subjecting the liquid to pressure and urging the lips into sealing contact with the stationary member when the rotatable member is stationary to prevent the escape of liquid from the chamber, said bellows means serving to permit the volume of the chamber to expand under the influence of centrifugal force on the liquid resulting from rotation of the rotatable member, whereby the liquid and the lips may move radially outwardly, out of contact with the stationary member, leaving the liquid in contact with the flange only, thereby providing a substantially frictionless seal when the rotatable member is rotating.

6. A seal for concentric stationary and rotatable members, the latter of which is adapted at times to be maintained stationary, comprising an annular flange projecting radially from the stationary member, casing means carried by the rotatable member in concentric relation to the flange of annular, toroidal, flexible, resilient envelope in said chamber embracing the flange and of less outside diameter than the maximum inside diameter of the chamber, a pair of flexible resilient lips associated with the inner edges of the envelope, a body of liquid in the envelope under sufficient pressure, when the rotatable member and the envelope are stationary to maintain the lips in contact with the stationary member and to distend the outside diameter of the envelope, thereby providing a liquid seal and a supplemental, solid, resilient, physically contacting seal between the members when stationary, centrifugal forces resulting from rotation of the rotable member serving to distend the envelope further to increase its volume to withdraw the liquid from contact with the stationary member but not from the flange, and to displace the lips from contact with the stationary member, thereby producing an exclusively liquid, substantially frictionless seal.

7. A seal for concentric stationary and rotatable members, the latter of which is adapted at times to be maintained stationary, comprising an annular flange projecting radially from the stationary member, casing means carried by the rotatable member in concentric relation to the flange and provided with a regularly recessed or scalloped inner periphery, an annular, toroidal, flexible, resilient envelope in said chamber embracing the flange, a pair of flexible resilient lips associated with the inner edges of the envelope, a body of liquid in the envelope under sufficient pressure, when the rotatable member and the envelope are stationary to maintain the lips in contact with the stationary member and to distend the envelope partially into the recesses, thereby providing a liquid seal and a supplemental, solid, resilient, physically contacting seal between the members when stationary; centrifugal forces resulting from rotation of the rotable member serving to distend the envelope further into the recesses to withdraw the liquid from contact with the stationary member but not from the flange, and to displace the lips from contact with the stationary member, thereby producing an exclusively liquid, substantially frictionless seal.

8. A seal for concentric elements adapted for relative rotation and for relative non-rotation at different times, comprising a circular flange on one element disposed radially with respect to the axis of rotation of the other element, means carried by the second-mentioned element defining an expansible toroidal chamber surrounding said flange, flexible sealing means at the inner circumference of the chamber, and a body of liquid filling the chamber and maintaining the sealing means in sealing contact with the first-mentioned element when the second-mentioned element is at rest, to retain the liquid in the chamber, rotation of the second-mentioned element resulting in centrifugal force resulting from rotation of the first-mentioned element in the liquid and in the sealing means, thereby expanding the chamber, and withdrawal of the liquid and the sealing means from contact with the other element, the seal being effected by contact of the liquid with the flange and the chamber walls.

9. A seal for rotatable and stationary concentric elements, comprising a circular flange on the stationary element disposed radially with respect to the axis of rotation of the other element, means carried by the rotatable member defining a toroidal chamber surrounding a flange, circular flexible sealing means carried by the chamber defining means at the radially inner circumference of the chamber, and a body of liquid filling the chamber and maintaining the sealing means in sealing contact with the stationary element when the rotatable element is at rest; rotation of the rotatable element serving to subject the liquid and the sealing means to centrifugal force, thereby expanding the chamber and retracting the liquid and the sealing means from contact with the stationary member, but maintaining the liquid in contact with the flange.

10. A seal for rotatable and stationary concentric elements, comprising a circular flange on the stationary element disposed radially to the axis of rotation of the other element, a flexible member carried by the rotatable element defining an expansible toroidal chamber surrounding and embracing the flange and having on its inner circumference flexible lips defining an annular slot through which the flange projects into the chamber, and a body of liquid filling the chamber when the rotatable member is at rest and maintaining the lips in sealing contact with the stationary element, centrifugal force resulting from rotation of the rotatable element serving to expand the chamber and to withdraw the lips from the stationary member.

11. In combination, a horizontal stationary shaft, a casing journalled for rotation about the axis of the shaft and having an opening through which the shaft extends, means for sealing the space between said opening and the shaft, said means comprising an annular, radial flange on the shaft, means associated with the casing defining an annular chamber surrounding and embracing the flange, an annular body of liquid in the chamber and providing a substantially frictionless seal with the flange when the casing is rotated, and flexible means, associated with said chamber-defining-means, for making physical contact with said shaft to prevent the escape of the liquid from the chamber and to provide a positive seal with the shaft when the casing is stationary, the last-mentioned means being adapted to be deflected by centrifugal force from contact with the shaft when the casing is rotated.

12. In combination, a horizontal stationary shaft, a casing journalled for rotation about the axis of the shaft and having an opening through which the shaft extends, means for sealing the space between said opening and the shaft, said means comprising an annular, radial flange on the shaft, an expansible and contractible chamber carried by the casing surrounding and embracing the flange, an annular body of liquid in the chamber providing a substantially frictionless seal with the flange when the casing is rotated and annular resilient flexible means associated with said chamber for making physical contact with said shaft upon contraction of said chamber when the casing is stationary to prevent the escape of the liquid and to provide a positive seal with the shaft, the last-mentioned means being adapted to be deflected by centrifugal force from contact with the shaft when the casing is rotated and the chamber expands under centrifugal force.

13. In combination, a horizontal stationary shaft, a casing journalled for rotation about the axis of the shaft and having an opening through which the shaft extends, means for sealing the space between said opening and the shaft, said means comprising an annular, radial flange on the shaft, an expansible and contractible rubber envelope carried by the casing surrounding and embracing the flange, an annular body of liquid in the envelope providing a substantially frictionless seal with the flange when the casing is rotated and annular rubber resilient flexible lips associated with said envelope for making physical contact with said shaft upon contraction of said envelope when the casing is stationary to prevent the escape of the liquid and to provide a positive seal with the shaft, the lips being adapted to be deflected by centrifugal force from contact with the shaft when the casing is rotated and the envelope expands under centrifugal force.

14. In combination, a stationary casing having an opening therein, a horizontal shaft extending through the opening and journalled for rotation about its axis, and means for sealing the space between the opening and the shaft, said means comprising an annular radial flange projecting outwardly from the casing beyond said opening, means carried by the shaft, projecting outwardly therefrom and defining an annular chamber surrounding and embracing the flange, a body of liquid in the chamber providing a substantially frictionless seal with the flange when the shaft is rotated, and flexible means associated with said chamber-defining-means for making physical contact with the casing on opposite sides of the flange to prevent the escape of the liquid and to provide a positive seal when the shaft is stationary, the last-mentioned means being adapted to be deflected by centrifugal force from contact with the casing when the shaft is rotated.

15. In combination, a stationary casing having an opening therein, a horizontal shaft extending therethrough and journalled for rotation about its axis, and means for sealing the space between the opening and the shaft, said means comprising an annular radial flange projecting outwardly from the casing beyond said opening, means projecting outwardly from the shaft and toward the casing defining an annular, expansible and contractible chamber surrounding and embracing the flange, a body of liquid in the chamber providing a substantially frictionless seal when the shaft and chamber are rotated, resilient, flexible, annular lips at the inner margin of the chamber making physical contact with the casing on opposite sides of the flange to prevent the escape of liquid and to provide a positive seal when the shaft is stationary, said lips being adapted to be deflected by centrifugal force from the contact with the casing when the shaft is rotated and the chamber expands under centrifugal force acting upon the liquid therein.

16. In combination, a stationary casing having a hollow cylindrical extension therein, a horizontal shaft extending therethrough and journalled for rotation about its axis, and means for sealing the space between the opening in the extension and the shaft, said means comprising an annular radial flange projecting outwardly from the extension, means projecting outwardly from the shaft and toward the casing defining an annular, expansible and contractible chamber surrounding and embracing the flange, a body of liquid in the chamber providing a substantially frictionless seal when the shaft and chamber are rotated, resilient, flexible, annular lips at the inner margin of the chamber making physical contact with the casing extension on opposite sides of the flange to prevent the escape of liquid and to provide a positive seal when the shaft is stationary, said lips being adapted to be deflected by centrifugal force from the contact with the casing extension when the shaft is rotated and the chamber expands under centrifugal force acting upon the liquid therein.

WARREN NOBLE.

REFERENCES CITED

The following references are of record in the file of this patent:

UNITED STATES PATENTS

| Number | Name | Date |
|---|---|---|
| 1,695,320 | Carrier | Dec. 18, 1928 |
| 1,720,310 | Wilcox | July 9, 1929 |
| 1,932,214 | Hornschuck | Oct. 24, 1933 |

FOREIGN PATENTS

| Number | Country | Date |
|---|---|---|
| 182,441 | Great Britain | 1922 |
| 185,381 | Great Britain | May 30, 1923 |